No. 705,413. Patented July 22, 1902.
J. W. LEWELLEN.
OIL BURNER.
(Application filed Dec. 14, 1901.)
(No Model.)
Fig. 1.
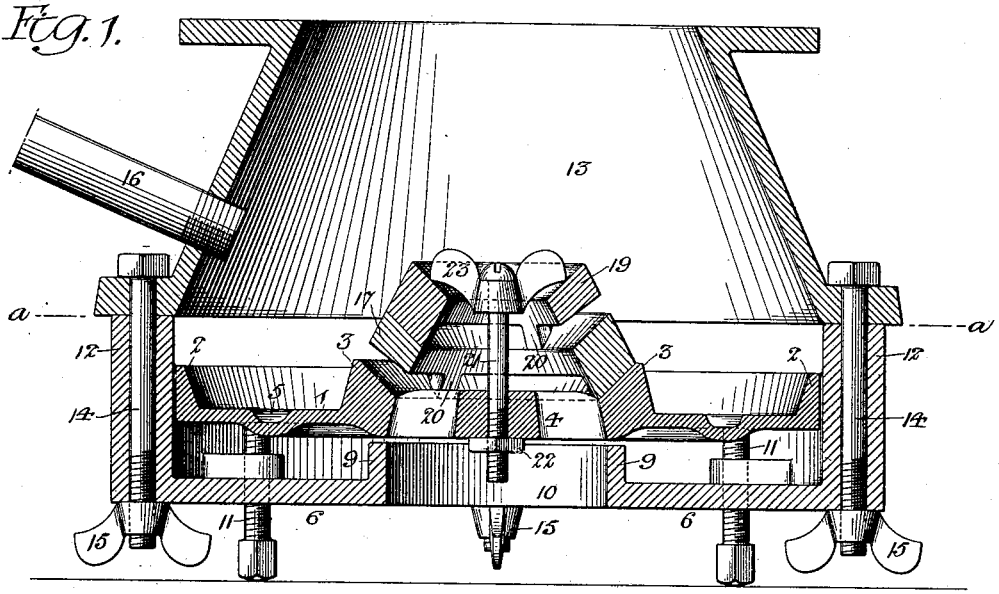
Fig. 2.
Fig. 3.
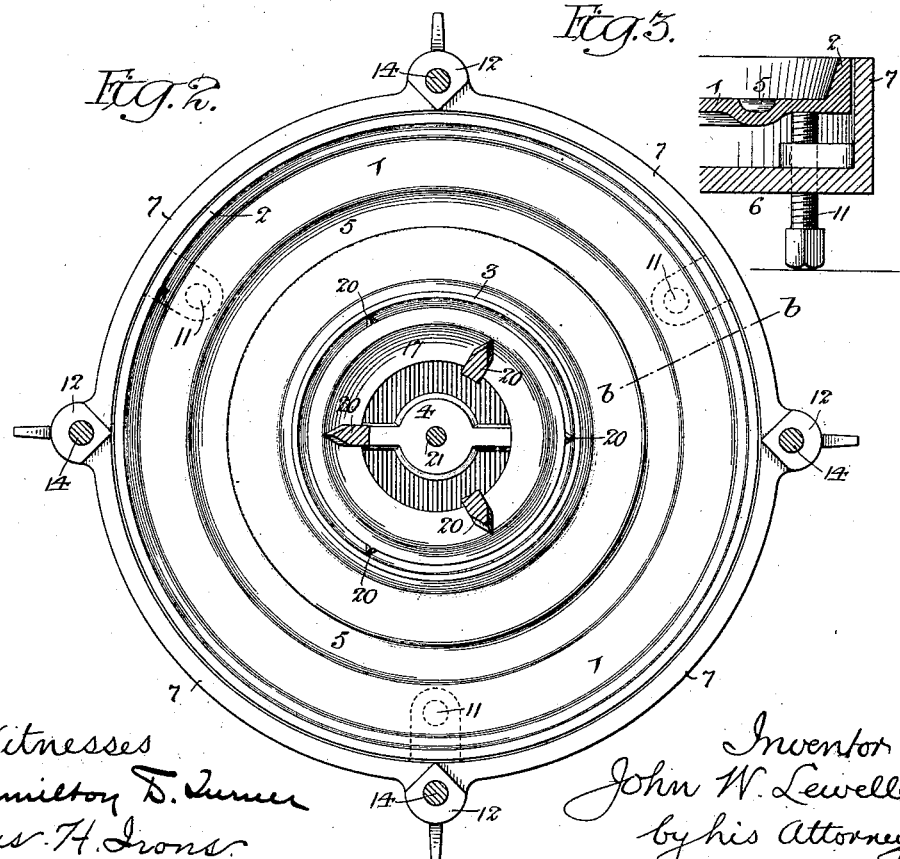
Witnesses
Hamilton D. Turner
Titus H. Irons.
Inventor
John W. Lewellen
by his Attorneys
Howson & Howson

UNITED STATES PATENT OFFICE.

JOHN W. LEWELLEN, OF PHILADELPHIA, PENNSYLVANIA.

OIL-BURNER.

SPECIFICATION forming part of Letters Patent No. 705,413, dated July 22, 1902.

Application filed December 14, 1901. Serial No. 85,905. (No model.)

*To all whom it may concern:*

Be it known that I, JOHN W. LEWELLEN, a citizen of the United States, residing in Philadelphia, Pennsylvania, have invented certain Improvements in Oil-Burners, of which the following is a specification.

My invention relates to that class of oil-burners in which the oil is fed into an open pan ignited so as to burn with a flame extending over the entire surface of the body of oil contained in the pan, the object of my invention being to so construct such a burner as to insure the heating of the oil to the temperature necessary for its proper combustion and also to supply air in such volume as to insure a supply of oxygen sufficient to effect the complete combustion of the carbon, and, further, to prevent the accumulation of soot upon the burner. This object I attain in the manner hereinafter set forth, reference being had to the accompanying drawings, in which—

Figure 1 is a transverse section of an oil-burner constructed in accordance with my invention. Fig. 2 is a sectional plan view of the same on the line *a a*, Fig. 1; and Fig. 3 is a transverse section on the line *b b*, Fig. 2.

The oil-receiving pan 1 has an external rim 2 and an internal rim 3, the latter surrounding a central opening in the pan, which is bridged by a cross-bar 4, so as to provide a passage for the vertical flow of air. In the bottom of the pan, about midway between the inner and outer rims of the same, is an annular depression 5, which receives the oil first entering the pan and causes it to flow completely around the same before it enters in quantity sufficient to fully cover the bottom of the pan. The oil-pan is contained within a casing 6, having an outer rim 7 and a central rim 9, the latter surrounding a central opening 10. The pan 1 is supported upon screws 11, which pass through threaded openings in the bottom of the casing 6 and extend below the latter, so as to serve as a support therefor. The inner flange 9 of the outer casing 6 approaches closely to the bottom of the oil-pan, and the outer rim 7 of said casing 6 approaches closely to the outer rim 2 of the oil-pan and extends to a point above the bottom of the pan and preferably to the top of the rim 2, so that between the pan and the casing 6 there is a dead-air space, which serves as a non-conductor of heat from the pan, and thereby insures the heating of the same to the high temperature necessary to effect the proper combustion of the oil deposited in the pan. At suitable intervals the casing 6 has vertical posts or studs 12, which support a conical hood 13, the bottom of the latter being so far above the top of the outer rim of the pan that a free inflow of air between the two is permitted. The hood 13 is secured to the studs 12 of the casing 6 by means of bolts 14 and nuts 15 or in any other suitable manner. A pipe 16 extends through the hood 13 at one side of the same and serves to deliver into the pan 1 the supply of oil necessary to maintain combustion in the burner. The inner rim 3 of the pan has an outwardly-flaring top, and above the same are mounted two outwardly-flaring deflecting-rings 17 and 19, each having downwardly-projecting supporting-legs 20, those of the ring 17 being supported upon the flaring top of the inner rim 3 of the pan, while the legs 20 of the upper ring 19 are supported upon the flaring top of the lower ring 17, the entire structure being clamped together vertically by means of a bolt 21 and nut 22, the head of the bolt resting upon a cross-bar 23, which bears upon the flaring top of the ring 19.

The supply of oil being introduced into the pan 1 and ignited therein burns upon the surface, a free supply of air to support combustion being admitted through the spaces between the rings 17 and 19 and between the ring 17 and the inner rim 3 of the pan, there being also an inward flow of air through the space between the top of the pan and the lower edge of the hood 13. Hence air is provided in ample volume to effect the combustion of all of the carbon contained in the oil. The pan 1 soon becomes highly heated, as is necessary in order to impart to the oil the temperature necessary for proper combustion, the pan being for this reason preferably composed of brass or other readily-heated metal and cooling of the pan being prevented by the dead-air chamber which is maintained below the same.

In order to prevent the formation of eddies in the air-currents which would lead to the deposit of soot wherever formed, the legs 20 of the rings 17 and 19 are tapered at their outer portions, as shown in Fig. 2, and the studs 12 of the casing 6 are tapered inwardly, as also shown in said figure, so that there is no break in the volumes of air flowing upwardly and outwardly between the rim 3 and ring 17 and between the latter and the ring 19, or in the volume of air flowing inwardly between the top of the pan and the bottom of the hood 13.

Although I have shown the burner as provided with two central rings, one above the other, one ring only need be employed, if desired, or more than two rings might be used.

Having thus described my invention, I claim and desire to secure by Letters Patent—

1. The combination in an oil-burner, of the oil-receiving pan having a central opening for the passage of air, with a casing containing said pan and also having a central air-passage, said casing forming, beneath the pan, a dead-air chamber, substantially as specified.

2. An oil-burner having an oil-receiving pan with inner and outer raised rims, the inner rim surrounding an air-passage, a deflecting ring or rings mounted above the inner rim of the pan and serving to direct the air outwardly into the burning vapor arising from the oil in the pan, and a hood mounted above the pan and providing between its lower edge and the top of the pan an opening for the inflow of air, substantially as specified.

3. The combination in an oil-burner, of an oil-receiving pan having a central air-passage through it, a casing for said pan also having a central air-passage and forming a dead-air chamber beneath the pan, and a hood mounted on said casing so that its lower edge is above the top of the pan and provides a space for the inflow of air, substantially as specified.

4. The combination in an oil-burner, of an oil-receiving pan having an inner rim surrounding an air-passage, and one or more deflecting-rings mounted above said rim so as to provide spaces for the outflow of air from the central passage, the supporting-legs being tapered at their outer portions so as to permit a flow of air around the entire circumference of the rim, substantially as specified.

In testimony whereof I have signed my name to this specification in the presence of two subscribing witnesses.

JOHN W. LEWELLEN.

Witnesses:
F. E. BECHTOLD,
JOS. H. KLEIN.